(12) United States Patent
Tong et al.

(10) Patent No.: US 7,006,042 B2
(45) Date of Patent: Feb. 28, 2006

(54) ANTENNA ARRAY SYSTEM, METHOD OF CONTROLLING THE DIRECTIVITY PATTERN THEREOF, AND MOBILE TERMINAL

(75) Inventors: Fangwei Tong, Tokyo (JP); Masanori Kato, Yokohama (JP)

(73) Assignees: Kyocera Corporation, Kyoto (JP); KDDI Corporation, Tokyo (JP)

( * ) Notice: Subject to any disclaimer, the term of this patent is extended or adjusted under 35 U.S.C. 154(b) by 308 days.

(21) Appl. No.: 10/661,874

(22) Filed: Sep. 11, 2003

(65) Prior Publication Data

US 2004/0125867 A1  Jul. 1, 2004

(30) Foreign Application Priority Data

Sep. 13, 2002  (JP) .............................. 2002-268429

(51) Int. Cl.
  *H01Q 3/00* (2006.01)
  *H04B 1/69* (2006.01)
  *H04B 7/00* (2006.01)

(52) U.S. Cl. ...................... 342/377; 342/383; 375/148; 375/349; 455/278.1

(58) Field of Classification Search ............... 342/377, 342/383
  See application file for complete search history.

(56) References Cited

U.S. PATENT DOCUMENTS

| | | | |
|---|---|---|---|
| 6,064,338 A * | 5/2000 | Kobayakawa et al. | ...... 342/378 |
| 6,292,135 B1 | 9/2001 | Takatori et al. | |
| 6,349,218 B1 | 2/2002 | Nakagawa et al. | |
| 6,385,181 B1 | 5/2002 | Tsutsui et al. | |
| 6,493,379 B1 * | 12/2002 | Tanaka et al. | ............... 375/150 |
| 6,498,928 B1 * | 12/2002 | Hiramatsu | ............... 455/278.1 |
| 6,882,681 B1 * | 4/2005 | Sano | ........................... 375/148 |
| 2003/0003890 A1 * | 1/2003 | Tanaka | ........................ 455/273 |
| 2004/0013094 A1 * | 1/2004 | Tong et al. | .................. 370/320 |

FOREIGN PATENT DOCUMENTS

JP          11-274976          8/1999

\* cited by examiner

*Primary Examiner*—Gregory C. Issing
(74) *Attorney, Agent, or Firm*—John J. Skinner, Jr.; Joel F. Lutzker; Schulte Roth & Zabel

(57) ABSTRACT

To realize an adaptive antenna array system which improves reception quality of desired signals by properly suppressing interference signals. The system includes: a signal detection section which detects base station signals from signals received by antenna elements; a control section which selects desired signals and interference signals to be cancelled from among the detected base station signals; a spatial signature detection section which detects spatial signatures of the desired signals and the interference signals to be cancelled; a virtual-signal generation section which generates virtual-signals for the interference signals to be cancelled using the spatial signatures thereof; an array weight generation section which generates array weights for the antenna elements by multiplying the inverse matrix of a correlation matrix of the virtual-signals by the spatial signatures of the desired signals; and a signal combining section which combines the received signals using the array weights.

15 Claims, 2 Drawing Sheets

ANTENNA ARRAY SYSTEM, METHOD OF CONTROLLING THE DIRECTIVITY PATTERN THEREOF, AND MOBILE TERMINAL

CROSS-REFERENCE TO RELATED APPLICATIONS

This application claims priority from Japanese Patent Application No. 2002-268429 filed on Sep. 13, 2002.

BACKGROUND OF INVENTION

1. Field of the Invention

The present invention relates to an antenna array system, a method of controlling the directivity pattern thereof, and a mobile terminal.

2. Description of the Related Art

Conventional adaptive antenna array systems employ the MMSE (Minimum Mean Square Error) criterion to control their array element weights so as to minimize a squared error between an array output signal and a reference signal which has been generated locally, for example, the LMS (Least Mean Square) and the RLS (Recursive Least Square) adaptive antenna array, which are so-called MMSE-based antenna arrays. In order to reduce the requirements for computation capacity and complexity in the generation of the reference signal in MMSE-based antenna arrays, CDMA (Code Division Multiple Access) systems often perform an MMSE-based antenna array operation, which forms a directivity pattern, after despreading processing.

In addition, one of the conventional antenna array systems, which operates on the basis of detection of the phase differences among antenna elements that form an antenna array, detects the phase differences among received signals received by the antenna elements by performing complex conjugate multiplication of the received signals, and then calculates array weights for the respective antenna elements based on the detected phase differences in accordance with an array weight formation algorithm (e.g., a DCMP (Directionally Constrained Minimization of Power) method), thereby forming a directivity pattern of the antenna array (see, for example, Japanese Unexamined Patent Application, First Publication No. Hei 11-274976).

The phase differences between array elements are related to the arrival directions of the received signals. More precisely, a phase vector consisting of the signal phases at array elements represents the arrival directions of the received signals. Hereinbelow, the phase vector is also referred to as a spatial signature.

However, it is necessary for systems employing the MMSE-based adaptive antenna array described above to generate the reference signal. Since the generated reference signal has a direct influence on the performance of the adaptive antenna array, the structure for generating the reference signal generally becomes more complex than the main structure for controlling weights for the adaptive antenna array. As a result of such a complex structure, it is difficult for devices having limited computation capacity (for example, mobile terminals) to implement the MMSE-based adaptive antenna array where the reference signal is necessary.

Moreover, although MMSE-based adaptive antenna array that is applied after performing the despreading process is capable of reducing the requirements of computation capacity for array weights updating and making reference signal generation easy, the MMSE-based adaptive antenna array applied after the despreading operation may be not able to form deep nulls due to the influence of the processing gain of the despreading operation, and thereby the performance for canceling interference deteriorates.

On the other hand, the adaptive antenna array system disclosed in Japanese Unexamined Patent Application, First Publication No. Hei 11-274976, selects a received signal from among the signals received by respective antenna elements as a standard signal, and compares the standard signal with the other received signals by complex conjugate multiplication to detect the spatial signature. However, the standard signal itself is one of the received signals, so that the standard signal is affected by interference and/or noise in the same manner as the other received signals, thereby deteriorating detection precision for the spatial signature. Moreover, the received signals received by the antenna elements include various signals (interference, noise, and so forth) in addition to one or more required signals. As a result, the aforementioned complex conjugate multiplication causes complicated intermodulation, and thus there is a possibility that the spatial signature is only detected with low precision. Additionally, even if efforts are made to enhance the detection precision by means of an averaging operation and so forth, detection precision for the spatial signature inevitably deteriorates due to the occurrence of intermodulation because it is impossible to completely eliminate interference components and the like. Moreover, since complex conjugate multiplication is one kind of nonlinear operation, it is difficult to estimate the influence of interference and the like on the detection precision for the spatial signature. Furthermore, it is necessary to perform matched filter operations for the respective antenna elements in order to detect the spatial signature in the aforementioned Japanese Unexamined Patent Application, First Publication No. Hei 11-274976, and thus a large number of operations become necessary and a large amount of electric power is consumed. In this way, it is difficult to enhance the detection precision for the spatial signature, so that it is difficult to optimally control the directivity pattern of the adaptive antenna array.

In addition, when forming nulls in the array directivity pattern to cancel the interference signals, conventional adaptive antenna array systems cannot selectively cancel the interference signals; rather, cancel all the interference signals. Moreover, when many null points are included in the directivity pattern of the antenna array, there is a possibility that many side lobes having high-levels will be generated in the directivity pattern. In particular, when the number of interference signals exceeds the degree of freedom of the adaptive antenna array, it becomes difficult to form a sharp beam oriented to the desired signals with a high array gain. As a result, the reception gain of the adaptive antenna array decreases, thereby causing reduction in the levels of the received desired signals. Similarly, when array weights which have been obtained in a reception process are compensated, if necessary, and then they are used in a transmission process to form a directivity pattern, it is also difficult to form a sharp beam oriented to the desired direction in the transmission process. Thus, it is difficult to enhance the transmission array gain.

Moreover, when it is necessary to receive two or more desired signals simultaneously, the conventional MMSE-based adaptive antenna array needs two or more array weights calculating sections in order to obtain two or more sets of array weights, thereby resulting in a complex system structure.

SUMMARY OF THE INVENTION

The present invention has been made in view of the problems described above, and an object of the present invention is to provide an adaptive antenna array system, a method of controlling the directivity pattern thereof, and a mobile terminal which can improve the reception quality of the desired signals by properly suppressing the interference signals.

A first aspect of the present invention is an adaptive antenna array system which includes: an antenna array which includes a plurality of antenna elements; a signal detection section which detects base station signals including desired signals and interference signals from among received signals received by the respective antenna elements; a control section which selects one or more desired signals and one or more interference signals to be cancelled from detected signals; a spatial signature detection section which detects spatial signatures of the desired signals and the interference signals to be cancelled based on the received signals; a virtual-signal generation section which generates one or more virtual-signals, the number of which is equal to the number of interference signals to be cancelled, based on the spatial signature of the interference signals to be cancelled; an array weight generation section which generates array weights for the respective antenna elements based on the virtual-signals and the spatial signatures of the desired signals; and a signal combining section which performs weighting for the received signals received by the respective antenna elements using the array weights and combines the weighted received signals to output a resultant combined signal.

In this case, it is not necessary for the control section to select all the interference signals which have been detected by the signal detection section.

A second aspect of the present invention is a method of controlling the directivity pattern of an adaptive antenna array comprising a plurality of antenna elements which is provided in an antenna array system which combines received signals received by the respective antenna elements to output a combined signal, and the method includes: a signal detection step which detects base station signals including desired signals and interference signals from the received signals; a control step which selects one or more desired signals and one or more interference signals to be cancelled from detected signals; a spatial signature detection step which detects spatial signature of the desired signals and the interference signals to be cancelled from the received signals; a virtual-signal generation step which generates virtual-signals, the number of which is equal to the number of interference signals to be cancelled, based on the spatial signatures of the interference signals to be cancelled; an array weight generation step which generates array weights for the respective antenna elements based on the virtual-signals and the spatial signatures of the desired signals; and a signal combining step which performs weighting for the received signals using the array weights and combines the weighted received signals to generate the combined signal.

In this way, the present invention selects the desired signals and the interference signals to be cancelled, and then forms the directivity pattern of the antenna array based on the spatial signatures of the selected desired signals and the spatial signatures of the selected interference signals. Therefore, the present invention can control the directivity pattern of the adaptive antenna array optimally, thereby making it possible to suppress the interference signals properly and to enhance the reception quality of the desired signals.

Furthermore, the present invention uses only the spatial signatures of the desired signals and the virtual-signals in order to calculate the array weights of the antenna array, so that the present invention becomes free from the influence of the processing gain of a despreading operation. As a result, the present invention can form deeper null points as compared with those in conventional adaptive antenna array systems which are applied after performing a despreading process, thereby making it possible to surely suppress the interference signals.

In addition, the present invention selects the desired signals, the number of desired signals, the interference signals to be cancelled, and the number of selected interference signals to be cancelled. Thus, the present invention can control the directivity pattern flexibly, so that the present invention makes it possible to form the optimal directivity pattern easily in accordance with the reception characteristics of the desired signals. For instance, even when it is necessary to form sharp beams in order to enhance the reception gain for the desired signals, the present invention can realize such beams easily by not selecting any of the interference signals so as not to form any null points.

In the adaptive antenna array system according to the present invention, the control section may select the desired signals and the interference signals to be cancelled based on signal levels of the detected signals. As a result, it becomes possible to properly select the interference signals to be cancelled, thereby making it possible to control the directivity pattern effectively.

In the adaptive antenna array system according to the present invention, the spatial signature detection section may detect signal phases at the respective antenna elements as the spatial signatures. Here, the detected spatial signatures indicate the phases at the respective antenna elements which result from the arrival directions of the received signals, or fading, or both of them. Accordingly, it becomes possible to coherently combine the signals received by the antenna elements even under fading environments. Thus, the adaptive antenna array system according to the present invention is applicable to fading environments in which it is impossible to determine the arrival directions of signals due to the influence of fading.

In the adaptive antenna array system according to the present invention, the array weight generation section may generate the array weights for the respective antenna elements by performing multiplication of an inverse matrix of a correlation matrix of the virtual-signals by the respective spatial signatures of the desired signals and by combining the results of the multiplication. Since the correlation matrix (a correlation matrix R(k) in Equation (12) described later) of the virtual-signals generated by the virtual-signal generation section contains no components relevant to the desired signal, it is possible to properly form null points corresponding to the interference signals to be cancelled using the array weights. As a result, the interference signals to be cancelled can be surely suppressed. Moreover, the present invention can form a directivity pattern which has multiple main beams using a single set of array weights, so that the present invention can receive the desired signals arriving from different directions simultaneously. Therefore, the present invention is especially useful in CDMA mobile terminal receivers where multi-path signals or signals transmitted from two or more base stations need to be received simultaneously.

In the adaptive antenna array system according to the present invention, the control section may select the interference signals to be cancelled so that the number of selected interference signals to be cancelled is equal to or less than the degrees of freedom of the adaptive antenna array. This makes it possible to form a proper directivity pattern which allows enhancing of the array gain in the directions of the desired signals. As a result, a problem in which the reception gain of the antenna array decreases can be avoided.

In the adaptive antenna array system according to the present invention, the spatial signature detection section may detect the spatial signatures by performing correlation operations between the received signals and a spreading code which has been generated locally (e.g., a pseudo-noise (PN) code). With this structure, unlike conventional antenna array systems as disclosed, for example, in Japanese Unexamined Patent Application, First Publication No. Hei 11-274976, there is no need to perform complex conjugate multiplication among the received signals. Moreover, it is not necessary to compare one of the received signals as a standard with the other received signals, so that it is possible to enhance the detection precision of the spatial signatures.

The adaptive antenna array system according to the present invention may further comprise a scaling section which adjusts amplitudes of the spatial signatures output from the spatial signature detection section so that the adjusted amplitudes fall within a predetermined range. This structure makes it possible to avoid a problem in which an overflow occurs in practical digital signal processing with a DSP (Digital Signal Processor).

In the adaptive antenna array system according to the present invention, the virtual-signal generation section may generate signals which are uncorrelated with each other as the virtual-signals.

In the adaptive antenna array system according to the present invention, the antenna elements may be arranged so that intervals among the antenna elements are wider than a predetermined value. With this structure, it becomes possible to enhance the capacity for suppressing the interference signals.

A mobile terminal according to the present invention is one which includes the aforementioned adaptive antenna array system.

DETAILED DESCRIPTION OF THE PREFERRED EMBODIMENTS

Hereinbelow, an embodiment of the present invention will be explained with reference to the attached drawings.

Figure 1:
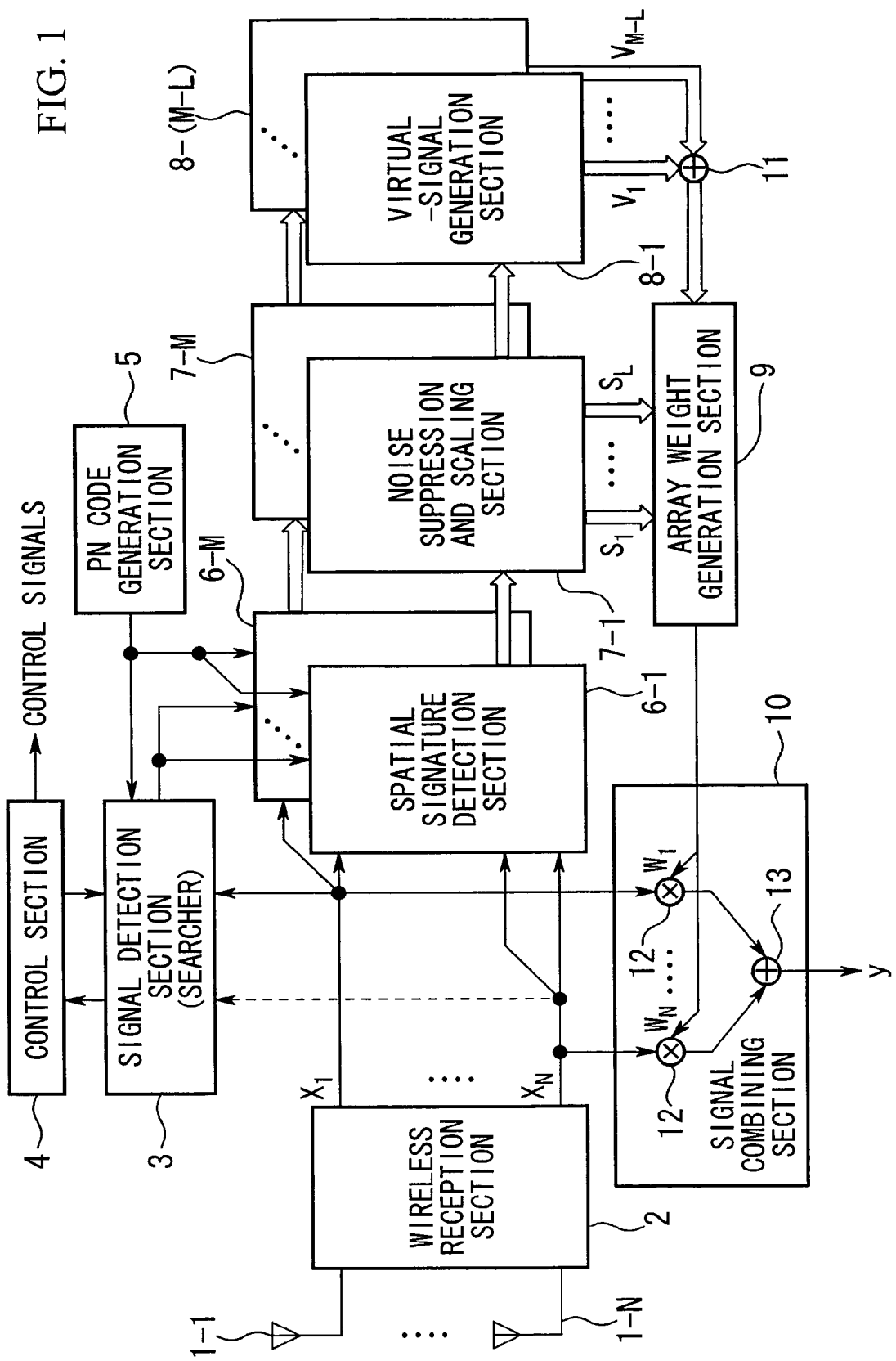
FIG. 1 is a block diagram showing the structure relating to reception functions of an adaptive antenna array system according to an embodiment of the present invention.

FIG. 1 is a block diagram showing the structure relating to reception functions of an adaptive antenna array system according to the embodiment of the present invention. The antenna array system shown in FIG. 1 can be installed in a portable telephone and so forth, and the system receives a wireless signal, in conformity with CDMA format which has been transmitted from one or more base stations, using an antenna array which comprises a plurality of antenna elements 1-1 to 1-N, thereby performing wireless communication.

In FIG. 1, a wireless reception section 2 amplifies N wireless signals received by the antenna elements 1-1 to 1-N, converts the amplified signals into complex baseband signals, converts the complex baseband signals into digital signals using an A/D (analog to digital) converter provided therein, and outputs the converted digital signals as received signals $x_1$ to $x_N$.

A signal detection section 3, which is generally called a searcher, performs a correlation operation between a received signal (for example, the received signal $x_1$) which has been arbitrarily selected from among the received signals $x_1$ to $x_N$ and a PN code (a spreading code) which has been locally generated by a PN code generation section 5. Based on the result of the correlation operation, the signal detection section 3 detects all the signals which have arrived from the base stations including multi-path signals (hereinafter referred to as "base station signals") and the chip synchronization timing corresponding to the respective base station signals, to the extent that the signal detection section 3 can identify the presence thereof. The signal detection section 3 then outputs to a control section 4 data indicating the respective signal levels of the detected base station signals and respective signal identification IDs (identifiers), for example, offsets of the PN code for the respective base station signals, allocated to the detected base station signals. In this way, the signal detection section 3 performs the correlation operation for only one received signal received by one of the antenna elements, and thus the number of operations which is necessary to detect the base station signals becomes small. For instance, the present embodiment can reduce the amount of operations to 1/N of that of the antenna array disclosed in Japanese Unexamined Patent Application, First Publication No. Hei 11-274976, where N is the number of the antenna elements.

Based on the respective signal levels of the base station signals detected by the signal detection section 3, the control section 4 selects one or more base station signals to be received as one or more desired signals and one or more base station signals to be cancelled (i.e., interference signals), which are signals other than the selected desired signals, from among the detected base station signals.

The control section 4 then selects spatial signature detection sections for making these spatial signature detection sections detect spatial signatures of the respective base station signals selected as the desired signals and those of the respective base station signals selected as the interference signals from among M spatial signature detection sections 6-1 to 6-M (where M is an integer greater than one). For example, when the total number of desired signals and interference signals is M and the number of desired signals is L (where L is an integer greater than zero), namely, the number of interference signals is M-L, the control section 4 selects the spatial signature detection sections 6-1 to 6-L for detection of the spatial signatures of the L desired signals and the spatial signature detection sections 6-(L+1) to 6-M for detection of the spatial signatures of the M-L interference signals. Based on this selection, the control section 4 instructs the signal detection section 3 to output the chip synchronization timing of the respective base station signals selected as the desired signals and that of the respective base station signals selected as the interference signals to the spatial signature detection sections 6-1 to 6-M. In response to the instruction from the control section 4, the signal detection section 3 actually outputs the chip synchronization timing described above to the spatial signature detection sections 6-1 to 6-M.

In addition, the maximum of the sum of the number of selectable desired signals and the number of selectable interference signals to be cancelled is equal to the number of spatial signature detection sections (i.e., M). In general, it is reasonable that the number M be equal to or less than the number of antenna elements N of the adaptive antenna array. However, the number M is not limited to this range.

As stated above, the control section 4 selects the base station signals to be cancelled based on the signal levels of the respective base station signals which have been detected, so that it is possible to properly select the interference signals to be cancelled from among all the interference signals. In addition, since the number of interference signals to be cancelled is restricted, it is possible to prevent the number of signals to be cancelled from exceeding the number of degrees of freedom of the adaptive antenna array. Moreover, when it is necessary to form a sharp beam pattern of the antenna array so as to increase the array gain in the directions of the desired signals, it is also acceptable that none of the base station signals are selected as the interference signals to be cancelled. In this way, the present embodiment can properly control the suppression of the interference signals.

In addition, the control section 4 performs control for suppression of the interference signals by controlling the respective sections provided in the antenna array system using various control signals. For example, besides the aforementioned control, the control section 4 shuts off power of one or more unused spatial signature detection sections when the sum of the number of desired signals which have been selected and the number of interference signals to be cancelled which have been selected is less than the total number of spatial signature detection sections (i.e., M).

Next, the respective spatial signature detection sections 6-1 to 6-M perform despreading processes for the received signals $x_1$ to $x_N$ using the PN code output from the PN code generation section 5 at the respective chip synchronization timings which have been determined by the signal detection section 3 corresponding to the respective base station signals selected by the control section 4, thereby extracting pilot signals included in the respective base station signals. These detected pilot signals include phase information at the respective antenna elements corresponding to the arrival directions of the base station signals which have been selected, so that the phase information is equivalent to the spatial signatures which represent the arrival directions of the base station signals. Thus, the spatial signature detection sections 6-1 to 6-M detect the extracted pilot signals as the spatial signatures of the base station signals selected by the control section 4.

Hereinbelow, the process of extracting the pilot signals, namely, the process of detecting the spatial signatures will be explained in detail.

We assume that the received signals from the antenna elements are represented as a vector $X(nT_S)$.

$$X(nT_S) = [x_1, x_2, \ldots, x_N]^T$$

where $^T$ denotes transposition, n denotes a sampling number, and $T_S$ denotes a sampling period.

Thus, received signals output from an antenna array elements in a mobile communication system in conformity with for example a CDMA format can be given by Equations (1) and (2).

$$X(nT_S) = \sum_{h=1}^{K} \{e^{jPN(nT_S - PN\_offset_h - d_h)}[1 + spt_h(nT_S - d_h)]\}S_h \quad (1)$$

where $e^{jPN(nT_S - PN\_offset_h - d_h)}$ denotes a spreading code (a PN code), $PN\_offset_h$ denotes an offset of the PN code which is used to uniquely distinguish the h-th base station h, $d_h$ denotes the propagation delay of a signal from the base station h, K denotes the number of base station signals, $spt_h(nT_S)$ denotes all the signals (SYNC, Paging, Traffic, and so on) other than the pilot signal, "1" denotes the pilot signal, and $S_h$ denotes a spatial signature.

$$S_h = [A_{h1}e^{j\theta_{h1}}, \ldots, A_{hi}e^{j\theta_{hi}}, \ldots, A_{hN}e^{j\theta_{hN}}]^T \quad (2)$$

where $A_{hi}$ (h=1, ..., K, and i=1, ..., N) denotes the amplitude of a signal from the base station h received by the antenna element i, and $\theta_{hi}$ (h=1, ..., K, and i=1, ..., N) denotes the phase which results from the arrival direction, or fading, or both of them.

Thus, a spatial signature $S_{h0}$ of a signal which has arrived from a certain base station ho can be detected using Equation (3).

$$\sum_{n=n0}^{n0+T_C-1} X(nT_S)e^{-jPN(nT_S - PN\_offset_{h0} - d_{h0})} \approx T_C S_{h0} \quad (3)$$

where Tc denotes a range over which a despreading calculation is performed (a fixed integer), n0 denotes a temporal starting point for the despreading calculation, and $e^{-jPN(nT_S - PN\_offset_{h0} - d_{h0})}$ denotes a PN spreading code, more precisely despreading code, output from the PN code generation section 5.

A PN code offset, $PN\_offset_{h0}$, for the base station $h_0$ and a propagation delay, $d_{h0}$, of a signal which has arrived from the base station $h_0$ represent the chip synchronization timing which has been detected by the signal detection section 3 for the signal which has arrived from the base station $h_0$. Since Equation (3) represents a correlation operation (i.e., despreading calculation), it is possible to detect the spatial signature $S_{h0}$ of the signal from the base station $h_0$ according to the correlation characteristics of $spt_h(nT_S)$ which has been modulated with a Walsh code and the correlation characteristics of the PN code.

The time sequence of the spatial signature $S_{h0}$ can be detected by selecting the value of $n_0$ so as to satisfy $n_0 = kTc$ (where k=0, 1, 2, ... ), thereby making it possible to track a change in the arrival direction of the signal. The operation defined by Equation (3) is performed for each of the base station signals selected by the control section 4 to detect the spatial signatures of the respective base station signals.

Then, the spatial signature detection sections 6-1 to 6-M output the spatial signatures detected by the processes described above to respective noise suppression and scaling sections 7-1 to 7-M.

As described above, the spatial signature detection sections 6-1 to 6-M calculate the spatial signature using the correlation operations between the respective received signals $x_1$ to $x_N$ and the locally generated PN code. Therefore, unlike the conventional antenna array system, it is not necessary to perform complex conjugate multiplication among the received signals $x_1$ to $x_N$. Furthermore, it is not necessary to compare one of the received signals $x_1$ to $x_N$ which has been selected as a standard signal with the other received signals. Thus, it is possible to detect the spatial signatures with high precision.

The noise suppression and scaling sections 7-1 to 7-M have a function of suppressing noise and signals other than the focused signals for the respective spatial signatures output from the spatial signature detection sections 6-1 to 6-M, and a function of performing scaling operations for these spatial signatures. The focused signals represent base station signals for which spatial signatures should be detected.

The process of suppressing noise takes advantage of the fact that signals obtained by despreading uncorrelated signals have the same characteristics as pseudo-noise, and suppresses the noise by using a LPF (Low Pass Filter), for example, a moving average filter. Since the amplitudes of the spatial signatures for which the noise suppression process has been performed are tied to the amplitudes of the received signals (see Equation (2)), there is a possibility that a problem such as an overflow will occur in digital signal processing subsequent to the noise suppression process. To prevent this, the scaling process adjusts the amplitudes of the spatial signatures for which the noise suppression process has been performed so that the adjusted amplitudes fall within a predetermined range.

In this way, the scaling process simply adjusts the amplitudes of the spatial signatures so that the adjusted amplitudes fall within the predetermined range, and thus there are various methods of realizing the scaling process. The following is an example of the scaling process.

A spatial signature $S_h$ can be expressed as shown below.

$$S_h = [S_{h1}, S_{h2}, \ldots, S_{hN}]^T$$

where $S_{hi}$ (i=1, 2, ... N) is the i-th element of the spatial signature $S_h$.

First, an element having the largest absolute value is selected and denoted as $S_{max}$ from among all the elements $S_{hi}$ (i=1, 2, ... N).

$$S_{max} = \max[|S_{hi}|] \tag{4}$$

where $|S_{hi}|$ denotes the absolute value of the element $S_{hi}$.

Next, scaling is performed in accordance with Equation (5).

$$\frac{S_h}{S_{max}} \tag{5}$$

Equation (6) can be used instead of Equation (4). In this case, scaling should be performed in accordance with Equation (7) instead of Equation (5).

$$S_{avg} = \frac{1}{M_{select}N} \sum_{h=1}^{M_{select}} \sum_{i=1}^{N} |S_{hi}| \tag{6}$$

where $M_{select}$ denotes the sum of the number of desired signals selected by the control section 4 and the number of interference signals selected by the control section 4.

$$\frac{S_h}{S_{avg}} \tag{7}$$

After performing the scaling process, the noise suppression and scaling sections 7-1 to 7-M output spatial signatures $S_1$ to $S_L$ of the desired signals (for example, L desired signals), which have been selected by the control section 4, to an array weight generation section 9. In addition, the noise suppression and scaling sections 7-1 to 7-M output spatial signatures of interference signals (for example, M-L interference signals), which have been selected to be cancelled by the control section 4, to virtual-signal generation sections 8-1 to 8-(M-L).

In response to the spatial signatures which have been input, the virtual-signal generation sections 8-1 to 8-(M-L) generate virtual-signals $V_1$ to $V_{M-L}$, the number of which is equal to the number of interference signals to be cancelled (i.e., M-L). In this case, the virtual-signals $V_1$ to $V_{M-L}$ are generated such that there is no correlation among these virtual-signals. In other words, the virtual-signals $V_1$ to $V_{M-L}$ are generated such that these virtual-signals are uncorrelated with each other.

More specifically, the virtual-signal generation sections 8-1 to 8-(M-L) generate uncorrelated signals $g_1(k)$ to $g_{M-L}(k)$. Equations (8) to (10) show some examples of signals that can be used as the uncorrelated signals $g_1(k)$ to $g_{M-L}(k)$.

$$g_i(k) = \sin(2\pi f_i k) \tag{8}$$

where i is one of 1, 2, ..., and M-L, and $f_i$ is an arbitrary real number. Here, $f_i \neq f_j$ is satisfied when $i \neq j$.

$$g_i(k) = PN(k - U_i) \tag{9}$$

where i is one of 1, 2, ..., and M-L, PN ( ) denotes a PN code function, and $U_i$ is an arbitrary integer. Here, $U_i \neq U_j$ is satisfied when $i \neq j$.

$$g_i(k) = PN(k - U_i)\sin(2\pi f_i k) \tag{10}$$

where i is one of 1, 2, ..., and M-L. Here, $f_i \neq f_j$ and $U_i \neq U_j$ are satisfied when $i \neq j$.

As shown in Equation (11), the virtual-signal generation sections 8-1 to 8-(M-L) multiply the signals $g_1(k)$ to $g_{M-L}(k)$ by the respective input spatial signatures, to obtain the virtual-signals $V_1$ to $V_{M-L}$.

$$V_i(k) = g_i(k) S_{L+i} \tag{11}$$

where i is one of 1, 2, ..., and M-L, and $S_{L+1}$ to $S_M$ are M-L spatial signatures corresponding to the M-L interference signals to be cancelled.

An adder 11 adds together the virtual-signals $V_1$ to $V_{M-L}$ and outputs a resultant signal to the array weight generation section 9.

Thus, the array weight generation section 9 generates array weights for the respective antenna elements 1-1 to 1-N using the input signals, that is, the spatial signatures $S_1$ to $S_L$ and the summation of the virtual-signals $V_1$ to $V_{M-L}$. The algorithm for generating the array weights will be explained in detail as follows.

First, a correlation matrix R(k) is defined as shown in Equation (12).

$$R(k) = E[V(k)V^H(k)] \tag{12}$$

where E [ ] denotes an ensemble average operation, V(k) denotes the summation of the virtual-signals $V_1$ to $V_{M-L}$ (i.e., the output from the adder 11), and $V^H(k)$ denotes the Hermitian transposed vector (complex conjugate transposed vector) of V(k).

Next, array weights {W; $w_1$ to $w_N$} are obtained by Equation (13).

$$W = R^{-1}(k) S\ H \tag{13}$$

where $R^{-1}(k)$ denotes the inverse matrix of R(k), S is a matrix $[S_1, \ldots, S_L]$ of the spatial signatures of the desired signals (for example, L desired signals), H denotes the transposed vector of $[H_1, \ldots, H_L]$, and $H_1$ to $H_L$ are arbitrary complex numbers. The vector H is used to combine main beams corresponding to the respective spatial signatures of the desired signals (e.g., the L desired signals). For example, $H_1$ to $H_L$ are all set to one. The directivity pattern of the adaptive antenna array formed by using array weights obtained from Equation (13) forms null points to cancel interference, the adaptive antenna array is then called null steering.

The correlation matrix R(k) shown in Equation (12) does not include the components of the desired signals. Thus, it is possible to surely form null points corresponding to the interference signals to be cancelled using the weight vector W, thereby surely suppressing the interference signals to be cancelled. Furthermore, it is possible to form a directivity pattern having multiple main beams using a single set of array weights W as defined by Equation (13). This allows receiving of the desired signals arriving from different directions simultaneously. Therefore, it is particularly useful in CDMA mobile terminal receivers where multi-path signals or signals or signals transmitted from two or more base stations need to be received simultaneously.

In addition, when none of base station signals are selected as the interference signals, the array weights can be calculated by Equation (14). The directivity pattern of the adaptive antenna array formed by using the weights obtained from Equation (14) directs main beams to the directions of the desired signals and forms no null points, the adaptive antenna array is then called beam steering.

$$W = S\ H \tag{14}$$

According to the array weight generation algorithm described above, reference signals are no longer necessary, so that it becomes possible to significantly simplify the structure of the adaptive antenna array system and to reduce computation complexity. Moreover, since the system becomes free from the influence of the processing gain, it is possible to form deep null points thereby surely suppressing the interference signals.

Next, as shown in Equation (15), in a signal combining section 10, multipliers 12 multiply the received signals {X; $x_1$ to $x_N$} by the respective array weights {W; $w_1$ to $w_N$} output from the array weight generation section 9, and then an adder 13 adds together the resultant signals to generate and output an array output signal y.

$$y = W^H X \tag{15}$$

where $W^H$ denotes the Hermitian transposed matrix of W.

When a directivity pattern of the adaptive antenna array is formed by using the weights obtained by Equation (13), it is desirable that intervals among the antenna elements be wider than a predetermined value, for example, half a wavelength, in order to enhance the capacity for suppressing the interference signals. On the other hand, when the array weights obtained by Equation (14) are used, none of the interference signals are cancelled, so that there are no requirements for the intervals among the antenna elements. Thus, for example, it becomes possible to set the intervals among the antenna elements to zero. In this case, however, it is necessary for the antenna elements themselves to have directivity. Alternatively, when the individual antenna elements forming the antenna array are omni-directional, it is necessary to arrange the antenna elements properly so that the antennal element in the array becomes a directional antenna.

In addition, the adaptive antenna array system according to the above embodiment is provided with the M spatial signature detection sections as shown in FIG. 1. However, it is also acceptable that only one spatial signature detection section is provided and that the process of detecting a spatial signature described above is repeated a maximum of M times sequentially at the respective chip synchronization timings on a time-shared basis.

Similarly, it is acceptable that only one noise suppression and scaling section is provided and that the process of suppressing noise and scaling described above is repeated a maximum of M times sequentially on a time-shared basis.

Moreover, it is acceptable that the scaling process is omitted when fluctuation in the amplitudes of the received signals is small.

Furthermore, the adaptive antenna array system according to the above embodiment is provided with a plurality of virtual-signal generation sections. However, the number of necessary virtual-signal generation sections depends on the number of interference signals to be cancelled. Therefore, in order to utilize the structure of the antenna array system more efficiently, it is also acceptable that only one virtual-signal generation section is provided and that the process of generating a virtual-signal is repeated the same number of times as the number of interference signals to be cancelled sequentially on a time-shared basis.

In addition, the allotment of functions (i.e., processes in signal processing) between the signal detection section 3 and the control section 4 is not limited to the one described above. For example, it is also acceptable that the signal detection section 3 outputs to the control section 4 information about the strengths and the chip synchronization timing of the respective base station signals, and the control section 4 selects the desired signals and the interference signals to be cancelled and then outputs the chip synchronization timing for these selected signals to the spatial signature detection sections 6-1 to 6-M.

Figure 2:
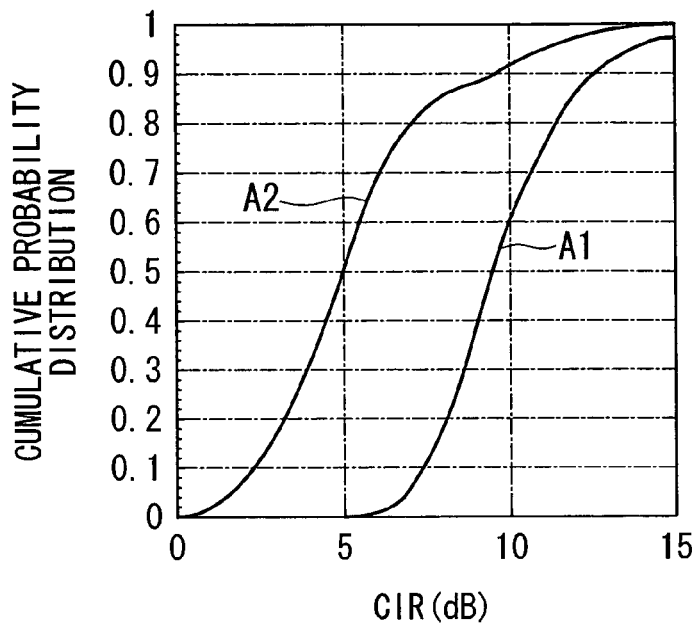
FIG. 2 is a graph of cumulative probability distributions of CIR (Carrier to Interference power Ratio), which shows a comparison between an adaptive antenna array system according to the above embodiment of the present invention and a conventional LMS antenna array system which is applied after performing a despreading process.

FIG. 2 is a graph of cumulative probability distributions of CIR (Career to Interference power Ratio), which shows a comparison between an adaptive antenna array system according to the above embodiment of the present invention and a conventional LMS antenna array system which is applied after performing a despreading process. The CIR evaluation results were obtained by carrying out a field test and using an antenna array comprising four antenna elements which are arranged at the corners of a regular rectangle with an element spacing of half a wavelength. Symbol A1 denotes the CIR of the adaptive antenna array system according to the present invention, while symbol A2 denotes the CIR of the conventional LMS antenna array system. FIG. 2 demonstrates that improvement in CIR is achieved by using the antenna array system according to the present invention.

Figure 3:
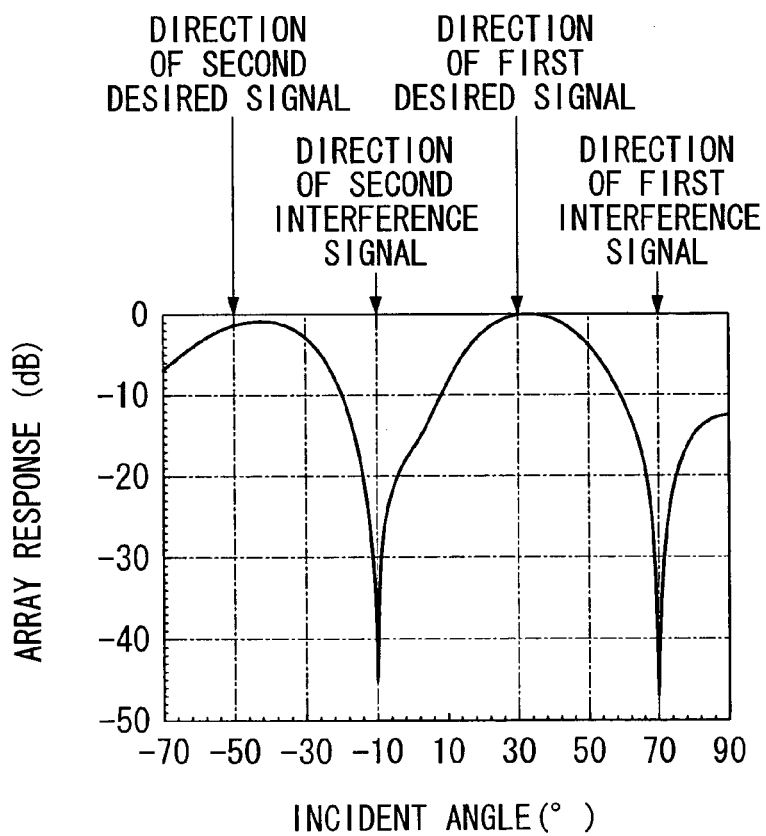
FIG. 3 is a diagram showing a directivity pattern of an adaptive antenna array formed by the adaptive antenna array system according to the above embodiment of the present invention.

FIG. 3 is a diagram showing an array directivity pattern formed by the adaptive antenna array system according to the above embodiment of the present invention. In the case of FIG. 3, the arrival direction of a first desired signal is 30°, the arrival direction and the relative signal level compared to the first desired signal of a second desired signal is −50° and 0 dB, respectively; the arrival direction and the relative signal level compared to the first desired signal of first and second interference signals are 70°, −3 dB, and −10°, −2 dB, respectively. Under such signal conditions, FIG. 3 shows an array directivity pattern formed by an antenna array comprising four elements which are arranged in linearity with a half wavelength element spacing. As can be understood from FIG. 3, main beams are formed in the arrival directions of the first and second desired signals, while null points are formed in the arrival directions of the first and second interference signals. These characteristics of the directivity pattern are particularly useful in CDMA mobile terminal receivers where multi-path signals or signals or signals transmitted from two or more base stations need to be received simultaneously.

In addition, the embodiment described above shows an example of forming a directivity pattern used in a reception process. However, it is also possible to form a directivity pattern used in a transmission process by properly compensating the array weights W if necessary.

In addition, the above-described embodiment relates to a mobile communication system in conformity with CDMA format, and the spatial signatures of the received signals are detected by using pilot signals. However, the present invention is not limited to such a system which uses the pilot signals. That is, as long as information about the phases of the signals received by the antenna elements which depend on the arrival directions of the received signals and/or fading can be extracted, it is possible to apply the technical idea according to the present embodiment to another wireless system which uses no pilot signals.

Although the present invention has been described above in terms of a particular preferred embodiment thereof, and with reference to the drawings, in practice it is not to be considered as being limited by any of the details of the shown embodiment or of the drawings; various alterations may be made in the details of implementation of the present invention, as long as no departure takes place from the range of its gist.

What is claimed is:

1. An antenna array system, comprising:
   an antenna array which includes a plurality of antenna elements;
   a signal detection section which detects base station signals including desired signals and interference signals from among received signals received by the respective antenna elements;
   a control section which selects one or more desired signals and one or more interference signals to be cancelled from detected signals;
   a spatial signature detection section which detects spatial signatures of the desired signals and the interference signals to be cancelled from the received signals;
   a virtual-signal generation section which generates one or more virtual-signals, the number of which is equal to the number of interference signals to be cancelled, based on the spatial signature of the interference signals to be cancelled;
   an array weight generation section which generates array weights for the respective antenna elements based on the virtual-signals and the spatial signatures of the desired signals; and
   a signal combining section which performs weighting for the received signals received by the respective antenna elements using the array weights and combines the weighted received signals to output a resultant combined signal.

2. An antenna array system according to claim 1, wherein the control section selects the desired signals and the interference signals to be cancelled based on signal levels of the detected signals.

3. An antenna array system according to claim 1, wherein the spatial signature detection section detects signal phases at the respective antenna elements as the spatial signatures.

4. An antenna array system according to claim 1, wherein the array weight generation section generates the array weights for the respective antenna elements by performing multiplication of an inverse matrix of a correlation matrix of the virtual-signals by the respective spatial signatures of the desired signals and by combining the results of the multiplication.

5. An antenna array system according to claim 1, wherein the spatial signature detection section detects the spatial signatures by performing correlation operations between the received signals and a spreading code which has been generated locally.

6. An antenna array system according to claim 1, further comprising a scaling section which adjusts amplitudes of the spatial signatures output from the spatial signature detection section so that the adjusted amplitudes fall within a predetermined range.

7. An antenna array system according to claim 1, wherein the virtual-signal generation section generates signals which are uncorrelated with each other as the virtual-signals.

8. A mobile terminal, comprising the antenna array system according to claim 1.

9. A mobile terminal, comprising the antenna array system according to claim 2.

10. A mobile terminal, comprising the antenna array system according to claim 3.

11. A mobile terminal, comprising the antenna array system according to claim 4.

12. A mobile terminal, comprising the antenna array system according to claim 5.

13. A mobile terminal, comprising the antenna array system according to claim 6.

14. A mobile terminal, comprising the antenna array system according to claim 7.

15. A method of controlling the directivity pattern of an antenna array comprising a plurality of antenna elements which is provided in an antenna array system which combines received signals received by the respective antenna elements to output a combined signal, the method comprising:
   a signal detection step which detects base station signals including desired signals and interference signals from the received signals;
   a control step which selects one or more desired signals and one or more interference signals to be cancelled from detected signals;
   a spatial signature detection step which detects spatial signatures of the desired signals and the interference signals to be cancelled from the received signals;
   a virtual-signal generation step which generates virtual-signals, the number of which is equal to the number of interference signals to be cancelled, based on the spatial signatures of the interference signals to be cancelled;
   an array weight generation step which generates array weights for the respective antenna elements based on the virtual-signals and the spatial signatures of the desired signals; and
   a signal combining step which performs weighting for the received signals using the array weights and combines the weighted received signals to generate the combined signal.

* * * * *